H. F. SMITH.
GAS PURIFICATION.
APPLICATION FILED NOV. 9, 1918.
1,430,696.
Patented Oct. 3, 1922.
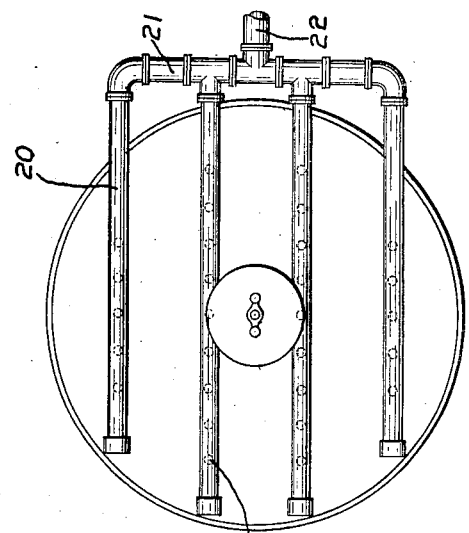
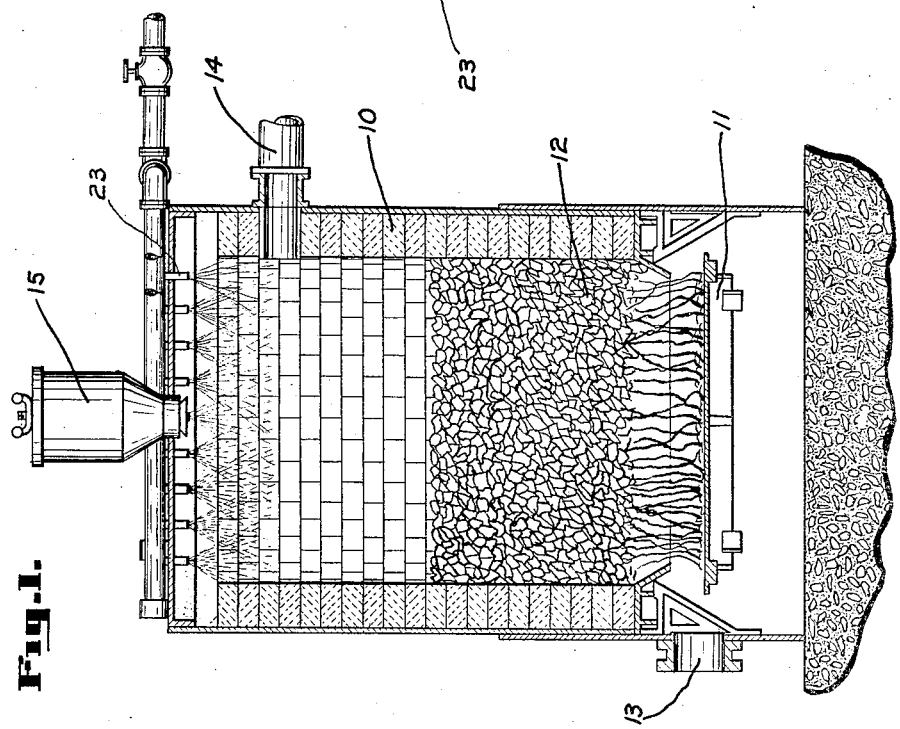
Witnesses
Warren Schmieding
Clifford D. Sachs
Inventor
Harry F. Smith
By Kerr, Page, Cooper and Hayward
Attorneys Patented Oct. 3, 1922.

1,430,696

UNITED STATES PATENT OFFICE.

HARRY F. SMITH, OF DAYTON, OHIO, ASSIGNOR, BY MESNE ASSIGNMENTS, TO THE GAS RESEARCH COMPANY. OF DAYTON, OHIO, A CORPORATION OF OHIO.

GAS PURIFICATION.

Application filed November 8, 1918. Serial No. 261,772.

*To all whom it may concern:*

Be it known that I, HARRY F. SMITH, a citizen of the United States of America, residing at Dayton, county of Montgomery, State of Ohio, have invented certain new and useful Improvements in Gas Purification, of which the following is a full, clear, and exact description.

This invention relates to gas purification and more particularly to a method of eliminating from producer gas certain objectionable impurities.

One object of the invention is to provide a method of eliminating from gas generated in a producer operating upon anthracite coal the sulphur dust which is generally present in such gas.

Other objects and advantages of the present invention will be apparent from the following description thereof.

When a gas producer is operated upon anthracite coal, or analogous fuel, a substantial quantity of sulphur dust is generally present in the evolved gases and is deposited in the purifiers and gas mains in such quantities as to seriously interfere with the effective operation of the apparatus. I have found that if water in a finely divided spray is introduced into the producer in such wise as to come into intimate contact with the evolved gases this objectionable dust will be eliminated, so that the clogging of the purifiers and gas delivery main and other attendant difficulties are avoided.

For securing the desired results a finely divided spray of water itself should be introduced, steam, my experience has shown, being ineffective in securing the desired cleansing action. And the same is true of water introduced in large size streams, the effective cleaning action resulting only where the water itself is introduced in finely divided spray.

My method of sulphur dust elimination has been used by me principally in an updraft producer, and in such apparatus I introduce the finely divided water into the generating chamber through spray nozzles set in the top of the producer. The water introduced through the spray nozzle is, therefore, brought into intimate contact with the evolved gas as it passes from the fuel bed to the gas offtake. And I have found that in such arrangement of the apparatus the sulphur dust normally present in the purifiers and gas mains will be eliminated from the gas before it reaches those parts of the apparatus.

Obviously this method of gas purification is not limited in its applicability to an updraft producer but may be used just as satisfactorily with a downdraft producer, in which case the spray nozzles would be so situated as to introduce the spray of water into the generating chamber below the fuel bed, such location of the spraying nozzles of course introducing the spray into the gas between the fuel bed and the gas offtake.

In carrying my method of gas purification into effect, therefore, a finely divided spray of water should be introduced into the generating chamber in such wise as to bring that spray into intimate contact with the evolved gas while it is still in substantially the same condition as when evolved, that is the water spray should be introduced into the gas immediately, or within a very short time, after the gas is generated and evolved from the fuel bed.

One form of apparatus for carrying out my method of gas purification is illustrated in the accompanying drawing, in which—

Fig. 1 is a vertical sectional view through a producer, comprising apparatus for carrying out this method of gas purification; and Fig. 2 is a plan view of the form of apparatus shown in Fig. 1.

In the drawing, 10 is the generating chamber of the producer, which may be of any desired or conventional form. The producer shown is a round type, updraft, machine although, of course, this method of purification is applicable to any other type of producer. Located in the producer is a grate 11 which carries the fuel bed 12 thereon. Opening into the lower part of the generating chamber is an intake pipe 13 through which a mixture of air and moisture is introduced into the producer and through the fuel bed during the generation of gas, the gas generated passing out of the producer through the offtake 14 which is located near the top of the generating chamber. Fuel is introduced into the producer from the fuel feeding mechanism 15, which is shown as being of conventional design.

Carried by the top of the producer are several pipes 20 each of which opens into a manifold 21 which is in turn connected to a main delivery pipe 22 through which water, from any desired source, is supplied to the pipes 20. Each of the pipes 20 has therein a plurality of spray nozzles 23 which extend downwardly through the top of the producer and terminate with their inner ends within the generating chamber. In operation of the device water is supplied under pressure through the pipe 22 and manifold 21 to the pipes 20, whence it passes through the nozzles 23, and is introduced into the generating chamber above the fuel bed in the form of a finely divided spray. The spray nozzles are so situated that the spray of water is introduced into the gas as it is evolved, and as a result the gas passing off through the offtake pipe is substantially free from free sulphur, which would otherwise be deposited in the purifying and delivery system with ensuing troubles. While I have stated above that the object of my invention is to eliminate free sulphur from the gas it is probable that the effect of the finely divided spray is not so much the elimination of sulphur dust by precipitating it after it is formed as the elimination of the sulphur by preventing its formation. The effective result, however, is that substantially no free sulphur, as such, is present in the gas when it leaves the generating chamber.

While the method of gas purification, and the apparatus for carrying that method into effect, as described above constitutes a preferred embodiment of my invention, that invention is by no means limited to the precise disclosure above set forth and for a true definition thereof reference should be had to the appended claims.

What I claim is:

1. In the generation of gas in a producer operating upon anthracite coal, or analogous fuel, the method of eliminating sulphur dust from the gas generated, which consists in spraying water into such gas before it passes out of the generating chamber.

2. In the generation of gas in a producer operating upon anthracite coal, or analogous fuel, the method of treating the gas generated for the purpose of removing sulphur dust therefrom, which consists in spraying finely divided water into the generating chamber in such wise as to cause it to contact intimately with the gas.

3. In the generation of gas from carbonaceous material the method of eliminating sulphur dust from the gas generated, which consists in spraying water in a finely divided form into the generating chamber in such wise as to come into intimate contact with the evolved gas.

4. In the generation of gas from anthracite coal, or analogous fuel, the method of preventing the formation of sulphur dust in the gas generated, which consists in spraying water into such gas as it is evolved.

In testimony whereof I affix my signature.

H. F. SMITH.

Witnesses:
J. W. McDonald,
M. A. Peare.